(12) United States Patent
Graham (10) Patent No.: US 8,051,544 B2
(45) Date of Patent: Nov. 8, 2011

(54) METHOD OF REPLACING INSULATORS ON A TOWER AND INSULATOR SUPPORT AND TRANSPORT ASSEMBLY THEREFOR

(75) Inventor: Larry Graham, Hollsopple, PA (US)

(73) Assignee: Haverfield International Incorporated, Gettysburg, PA (US)

( * ) Notice: Subject to any disclaimer, the term of this patent is extended or adjusted under 35 U.S.C. 154(b) by 987 days.

(21) Appl. No.: 12/004,830

(22) Filed: Dec. 24, 2007

(65) Prior Publication Data

US 2009/0158571 A1    Jun. 25, 2009

(51) Int. Cl.
*B23P 6/00* (2006.01)
*B23P 19/00* (2006.01)

(52) U.S. Cl. ............... 29/402.08; 29/402.03; 29/402.09; 29/402.11; 29/824; 29/823; 29/822

(58) Field of Classification Search ............... 29/402.02, 29/402.03, 402.06, 402.08, 402.09, 402.11, 29/760, 822, 823, 824
See application file for complete search history.

(56) References Cited

U.S. PATENT DOCUMENTS

| | | | | |
|---|---|---|---|---|
| 1,997,109 A * | 4/1935 | Fyfe | ................. | 254/232 |
| 2,546,362 A | 3/1951 | Graham | | |
| 2,613,913 A * | 10/1952 | Hubbard | ................. | 254/231 |
| 2,778,512 A | 1/1957 | Strona | | |
| 3,034,778 A | 5/1962 | Shaffer et al. | | |
| 3,490,385 A | 1/1970 | Gibbins et al. | | |
| 3,572,513 A | 3/1971 | Tantlinger et al. | | |
| 3,594,059 A | 7/1971 | Holz | | |
| 4,041,875 A | 8/1977 | Wallace | | |
| 4,113,112 A | 9/1978 | Ray | | |
| 4,187,048 A | 2/1980 | Bohlmann | | |
| 4,189,828 A * | 2/1980 | Chadwick, Jr. | ................. | 29/762 |
| 4,365,410 A * | 12/1982 | Houston et al. | ................. | 29/762 |
| 4,730,743 A * | 3/1988 | Rosman | ................. | 212/312 |
| 4,734,979 A * | 4/1988 | Sakamoto et al. | ................. | 29/822 |
| 4,760,640 A * | 8/1988 | Lawrence | ................. | 29/760 |
| 4,928,386 A * | 5/1990 | Schupp et al. | ................. | 29/824 |
| 4,930,970 A | 6/1990 | Sunderland | | |
| 5,297,483 A * | 3/1994 | Kakida et al. | ................. | 104/88.02 |
| 5,377,402 A * | 1/1995 | Semple, Jr. | ................. | 29/745 |
| D442,001 S | 5/2001 | Loveless | | |
| 6,539,602 B1 * | 4/2003 | Ozawa et al. | ................. | 29/402.11 |
| 2008/0168643 A1 * | 7/2008 | Albert et al. | ................. | 29/402.08 |

* cited by examiner

*Primary Examiner* — Essama Omgba
(74) *Attorney, Agent, or Firm* — Stuart J. Friedman (57) ABSTRACT

A method of replacing an electrical insulator on a conductor-supporting tower includes the steps of providing an elongate beam spanning the tower between a work site and a helicopter accessible site, a trolley movable on the beam between the sites and an insulator cradle detachably supported by the trolley for supporting the insulator during transport between the sites and to and from the tower via helicopter. The cradle is a partially peripherally enclosed, open-topped structure having a floor, an upstanding rear wall, peripheral walls sloping downwardly from the rear wall to a front wall, an opening in the front wall, an elongate slot in the floor extending rearwardly from the opening, the slot having a width greater than the diameter of an insulator shank but less than the diameter of an insulator skirt, the dimensions of the floor allowing an insulator skirt to lie flat thereon.

5 Claims, 7 Drawing Sheets

FIG. 11

METHOD OF REPLACING INSULATORS ON A TOWER AND INSULATOR SUPPORT AND TRANSPORT ASSEMBLY THEREFOR

FIELD OF THE INVENTION

The present invention relates to support and transport devices for high voltage electrical insulators and, more particularly, to an insulator trolley and cradle which is particularly suitable for supporting and transporting insulators during insulator replacement on lattice-type towers.

BACKGROUND OF THE INVENTION

High voltage power transmission lines carrying voltages in the hundreds of kilowatt range have been constructed to extend from spaced towers or poles in terrain which is often practically inaccessible to land vehicles. In recent years, a number of methods and devices have been developed to facilitate the repair and maintenance of high voltage power transmission lines which are accessed by helicopter.

Lattice-type towers are employed for supporting multiple high voltage electrical conductors. The conductors are typically supported under the arms or bridges of such towers using a pair of suspension insulators per conductor. Periodically, it is necessary to replace the insulators because they are visibly damaged or as part of a general maintenance plan. Typically, insulators are attached via pins to the towers and via pins to a yoke plate which supports the conductor. These pins must be manually removed by linemen placed on the tower via helicopter in order to replace the insulators. Damaged or worn insulators are removed from the tower via helicopter and replacement insulators are delivered to the tower via helicopter. It will be appreciated that high voltage electrical insulators are extremely heavy, e.g., about 200 pounds, and their weight makes them too difficult to be safely handled by linemen on the tower, particularly when it is appreciated that these linemen are standing on narrow girders. Thus, the aid of a helicopter is required. Unfortunately, a helicopter does not have access to the undersides of the tower bridge or tower arms from which the insulators are supported, making it difficult to work with the helicopter without the linemen physically dragging each damaged and replacement insulator along the tower to or from a location which the helicopter can access.

Accordingly, there exists a need for a transport device for moving damaged and replacement insulators along a lattice-type tower which may be safely emplaced on a tower via helicopter, which is light enough to be handled by a lineman on a tower, which is strong enough to support a heavy electrical insulator, which will be stable on a structure such as a lattice-type tower and which includes insulator support means for safely cradling an electrical insulator during movement along the tower and during transport to and from the tower via helicopter.

SUMMARY OF THE INVENTION

It is, therefore, a primary object of the present invention to provide a novel and improved insulator support and transport assembly which can be safely handled and used on a lattice-type tower by linemen emplaced on the tower by a helicopter.

It is also an object of the present invention to provide a novel and improved insulator support and transport assembly which is sufficiently lightweight that it can be hand positioned by a lineman on a lattice-type tower yet sufficiently strong to support a heavy electrical insulator.

It is another object of the present invention to provide a novel and improved insulator support and transport assembly which includes means for transporting an electrical insulator along a lattice-type tower from a location under the tower bridge or arms from which a damaged insulator is removed to a location accessible via helicopter where the damaged insulator can be removed from the tower and a replacement insulator delivered to the tower.

It is yet another object of the present invention to provide a novel and improved insulator support assembly for safely cradling an electrical insulator during movement along the tower and during transport to and from the tower via helicopter.

It is still another object of the present invention to provide a novel and improved insulator support assembly which includes means allowing easy loading and unloading of electrical insulators by linemen on a tower.

The foregoing and other objects are achieved in accordance with the present invention in a method of replacing an electrical insulator which supports a high voltage electrical conductor on a lattice-type tower comprising the steps of detaching a worn or damaged insulator from the tower and the conductor at a work site on the tower, removing the worn or damaged insulator via helicopter from a helicopter accessible site on the tower, delivering a replacement insulator via helicopter to the helicopter accessible site on the tower, and attaching the replacement insulator to the tower and the conductor at the work site, the improvement comprising: providing an insulator support and transport means on the tower, the transport means including elongate beam means spanning the tower between the work site and the helicopter accessible site and trolley means movable on the beam means between the work site and the helicopter accessible site, the support means including cradling means detachably supported by the trolley means for safely cradling the insulator during transport between the sites and during transport to and from the tower via helicopter; supporting the worn or damaged insulator in the cradling means while detaching the insulator from the tower and the conductor; moving the detached insulator in the cradling means along the beam to the helicopter accessible site; attaching the cradling means to a line extending from the helicopter, detaching the cradling means from the trolley means and removing the worn or damaged insulator from the tower in the cradling means via helicopter; delivering a replacement insulator in cradling means via helicopter to the helicopter accessible site on the tower; detachably supporting the cradling means and the replacement insulator by the trolley means and detaching the cradling means and the replacement insulator from the helicopter; moving the replacement insulator in the cradling means along the beam to the work site; and supporting the replacement insulator in the cradling means while attaching the replacement insulator to the tower and the conductor.

In another aspect of the improved method of the present invention, attachment means are provided on the beam at the helicopter accessible site for detachably supporting the cradling means, the worn or damaged insulator is moved in first cradling means along the beam to the helicopter accessible site, the first cradling means is attached to the attachment means on the beam and the first cradling means is detached from the trolley means, the helicopter delivers the replacement insulator in second cradling means, the second cradling means is detachably attached to the trolley means and is detached from the helicopter, the first cradling means is attached to the helicopter and detached from the attachment means and the worn or damaged insulator is removed by the helicopter from the tower in the first cradling means, the replacement insulator in the second cradling means is moved along the beam to the work site, and the replacement insulator is supported in the second cradling means while being attached to the tower and the conductor, whereby the helicopter is able to deliver a replacement insulator and pick up a worn or damaged insulator from the tower in a single trip.

In still another aspect of the present invention, the insulator comprises a string of vertically aligned individual insulators, each individual insulator having at least a larger diameter skirt and a concentric smaller diameter shank extending upwardly therefrom, the cradling means comprises a partially peripherally enclosed, open-topped structure having a floor, an upstanding rear wall, peripheral walls sloping downwardly from the rear wall to a front wall, an opening in the front wall, an elongate slot in the floor extending rearwardly from the opening in the front wall at least half the distance toward the rear wall, the slot having a width greater than the diameter of the insulator shank but less than the diameter of the insulator skirt, the shape and dimensions of the floor allowing an insulator skirt to lie flat thereon within the peripheral walls of the cradling means, whereby an insulator shank can be inserted through the opening in the front wall into the slot with the insulator skirt vertically above the shank passing above the front wall, and the insulator skirt above the shank lying flat on the floor behind the front wall when the insulator is fully inserted into the cradling means, the front wall preventing the insulator from sliding out of the cradling means.

In yet another aspect of the present invention, the cradling means desirably further includes a lifting ear extending above the rear wall and including an attachment aperture for attaching the cradling means to the trolley means or to a line extending from the helicopter. The cradling means also desirably includes a pair of chain support ears extending radially outwardly from the peripheral walls of the cradling means on opposite sides thereof, a lifting chain having a length greater than the largest dimension of the floor for attaching the cradling means to the trolley means or to the elongate beam means and means attaching opposite ends of the lifting chain to the chain support ears.

DETAILED DESCRIPTION OF THE INVENTION

Figure 1:
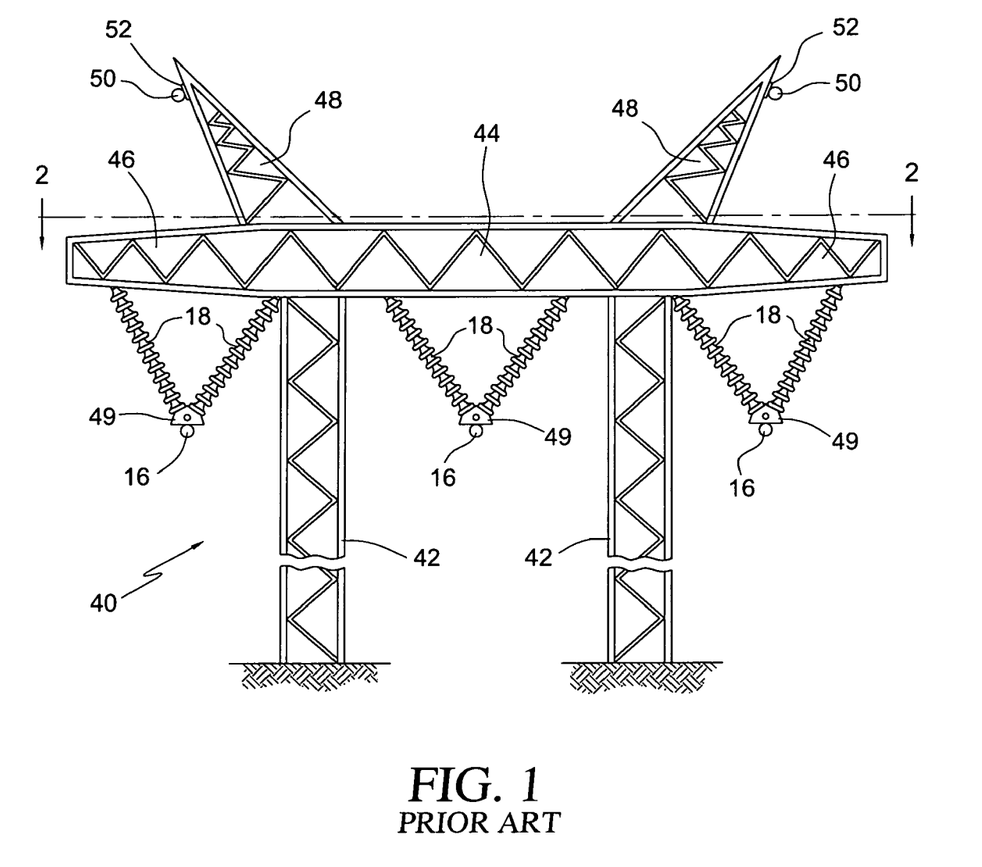
FIG. 1 is a front elevational view of a typical lattice-type tower for supporting high voltage power transmission lines via suspension insulators.
Figure 2:
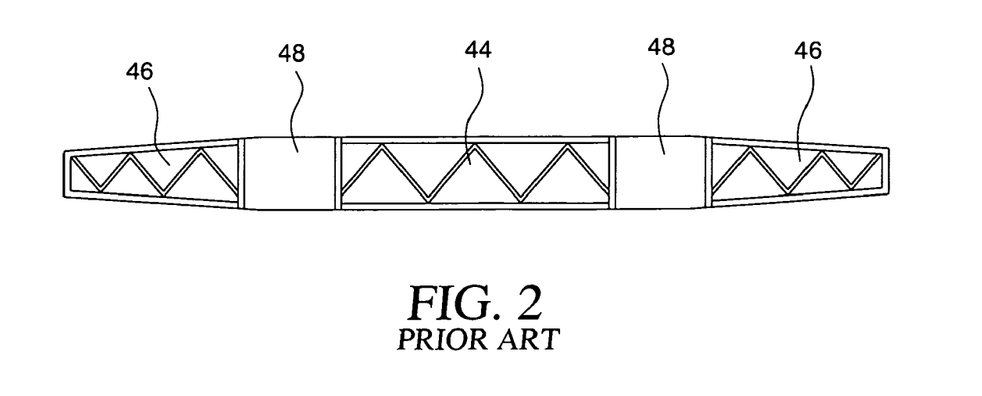
FIG. 2 is a top sectional view of the lattice-type tower taken along line 2-2 in FIG. 1.

Referring to FIGS. 1 and 2 there is shown a conventional steel lattice H-structure tower 40 for supporting multiple (frequently three) high voltage conductors 16. The lattice tower 40 comprises two legs 42 extending to the ground which support a central bridge 44 having left and right side extending tower arms 46. In addition, a pair of goat heads 48 extend upwardly and outwardly at an acute angle from the bridge 44 for supporting shield wires 50 via shield wire hardware 52. The lattice structure is typically constructed of angle stock. Central bridge structure 44 comprises an elongate rectangular box formed of angled stock girders, which gives the bridge a width as well as a depth. Left and right side extending tower arms 46 also comprise elongate boxes formed of angled stock girders except, as can be seen in FIGS. 1 and 2 respectively, the girders forming the tower arms 46 incline toward each other in both the vertical and horizontal planes. Conductors 16 are supported under each tower arm 46 and under central bridge 44 by a pair of suspension insulators 18 per conductor, with each pair of insulators 18 being spaced apart along the tower arms 46 and central bridge 44 to define a triangle formed by the two insulators 18 and the tower arms 46 or the central bridge 44, from which the insulators 18 depend. Typically, one end of each insulator 18 is connected via pins (not shown) to the tower arms 46 or central bridge 44 and the other end of each insulator 18 is connected via pins (not shown) to a yoke plate 49, which also supports conductor 16.

Referring to FIGS. 3-11, insulator support and transport assembly 10 is designed to be safely emplaced on a lattice-type tower via helicopter, light enough to be handled by a lineman on a tower, strong enough to support a heavy electrical insulator, stable on a structure such as a lattice-type tower and which includes insulator support means for safely cradling an electrical insulator during movement along the tower and during transport to and from the tower via helicopter.

The insulator support and transport assembly 10 includes an insulator trolley beam assembly 12 for transporting insulators along the tower which comprises an elongate I-beam 14 dimensioned in length to be about two feet longer than the front to back span of the bridge 44 of tower 40. As will be seen from the discussion which follows, I-beam 14 must have a length at least sufficient to span the bridge 44 of the tower 40. It is desirable that I-beam 14 be a bit longer, e.g., about two feet longer, than the span of the bridge of tower 40 but should not be much longer than that since the additional length is unnecessary and makes the I-beam heavier and more difficult to handle. I-beam 14, as can be seen most clearly in FIGS. 3 and 4, has an upper flange 15, a lower flange 17 and a vertical web 20 extending therebetween at the centerline of the flanges 15, 17 such that each flange 15, 17 has flange portions 15a,17a and 15b, 17b extending outwardly from the central web 20 in opposite directions. Desirably, I-beam 14 includes multiple, preferably two, girder engaging means, such as hook-shaped clamps (not shown) which are attachable to, as by brackets, and adjustably positionable at spaced locations along I-beam 14 for engaging the generally angle stock girders of lattice tower 40 to prevent insulator trolley beam assembly 12 from sliding along the girders. Generally, the I-beam 14 is provided with the girder engaging means unattached since spans of tower bridges and tower arms vary and, therefore, the spacing of the clamps on the I-beam will vary. Typically, the girder engaging means are attached to the I-beam and the girders on the job. In use I-beam 14 of insulator trolley beam 12 is positioned across the span of tower bridge 44 or tower arms 46 with its ends extending beyond the girders of the bridge 44 or arms 46, as can be seen most clearly in FIG. 5.

Figure 3:
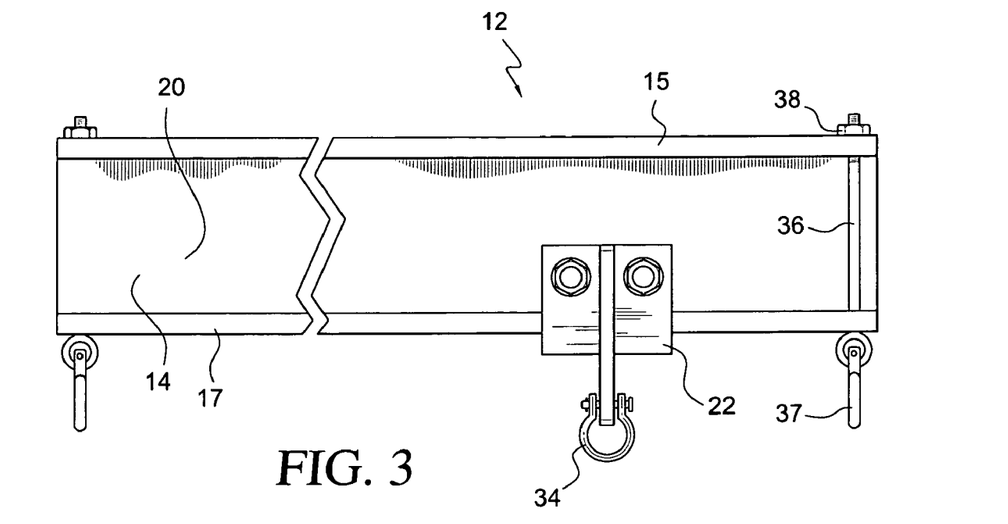
FIG. 3 is a front elevational view of the insulator transport assembly of the present invention.
Figure 4:
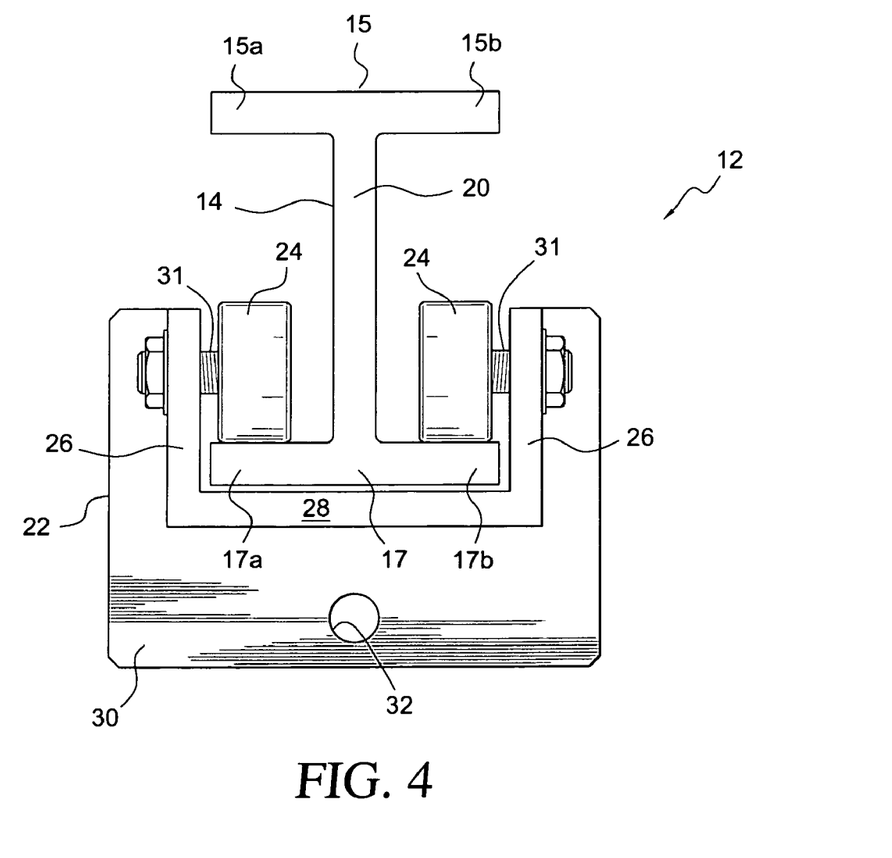
FIG. 4 is a side elevational view of the insulator transport assembly of FIG. 3.
Figure 5:
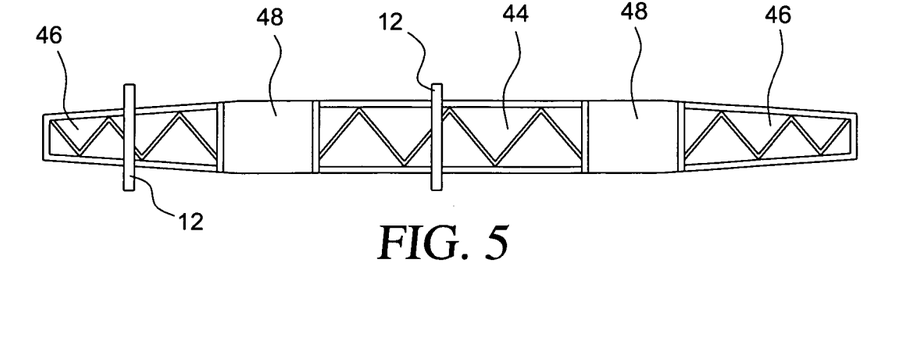
FIG. 5 is a schematic top view of the lattice-type tower showing the insulator transport assembly of the present invention emplaced on the parallel girders of the central bridge and on the inclined girders of one of the arms of the lattice-type tower of FIG. 1
Figure 6:
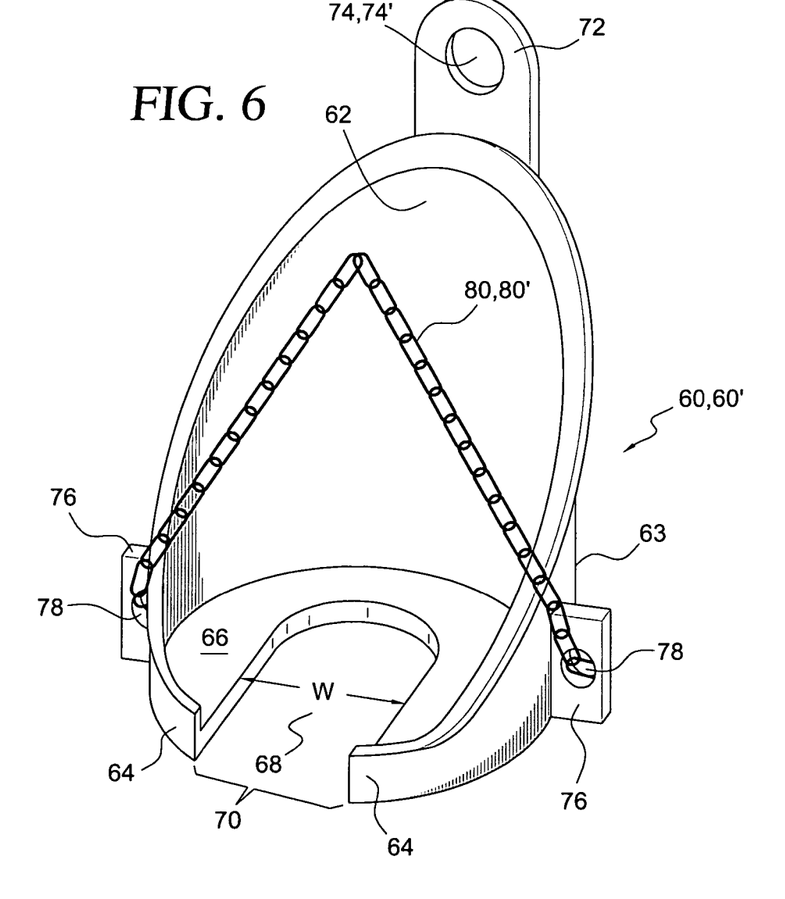
FIG. 6 is a perspective view of the insulator support assembly of the present invention.
Figure 7:
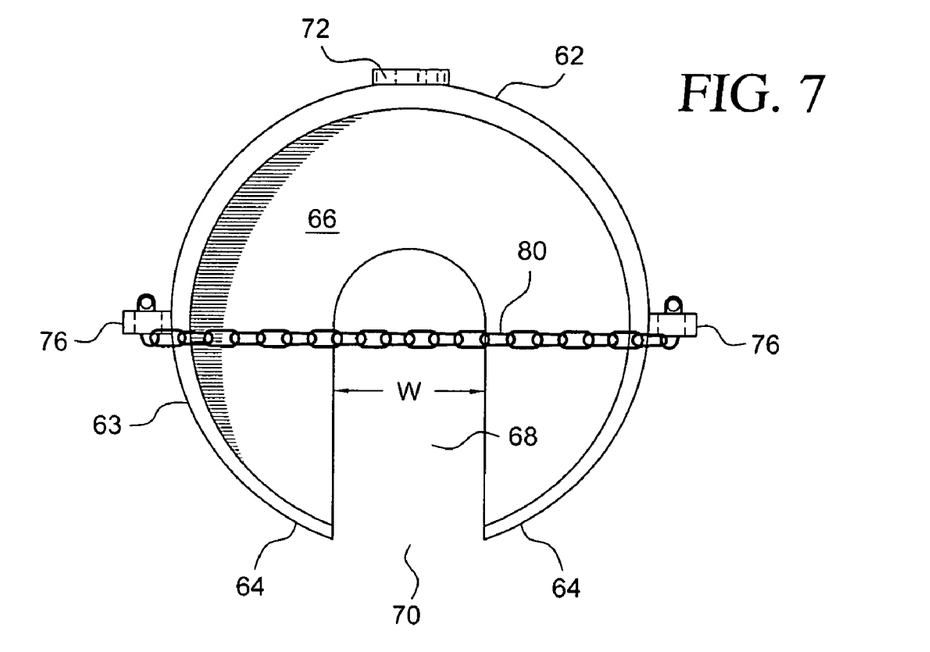
FIG. 7 is a top plan view of the insulator support assembly of FIG. 6.
Figure 8:
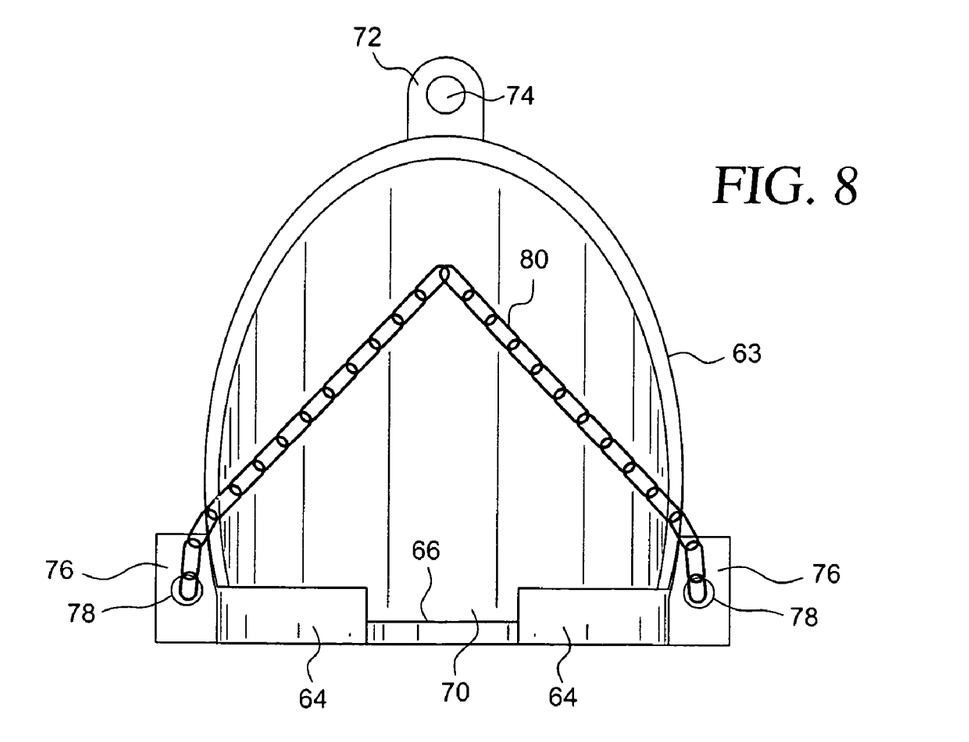
FIG. 8 is a front elevational view of the insulator support assembly of FIG. 6.
Figure 9:
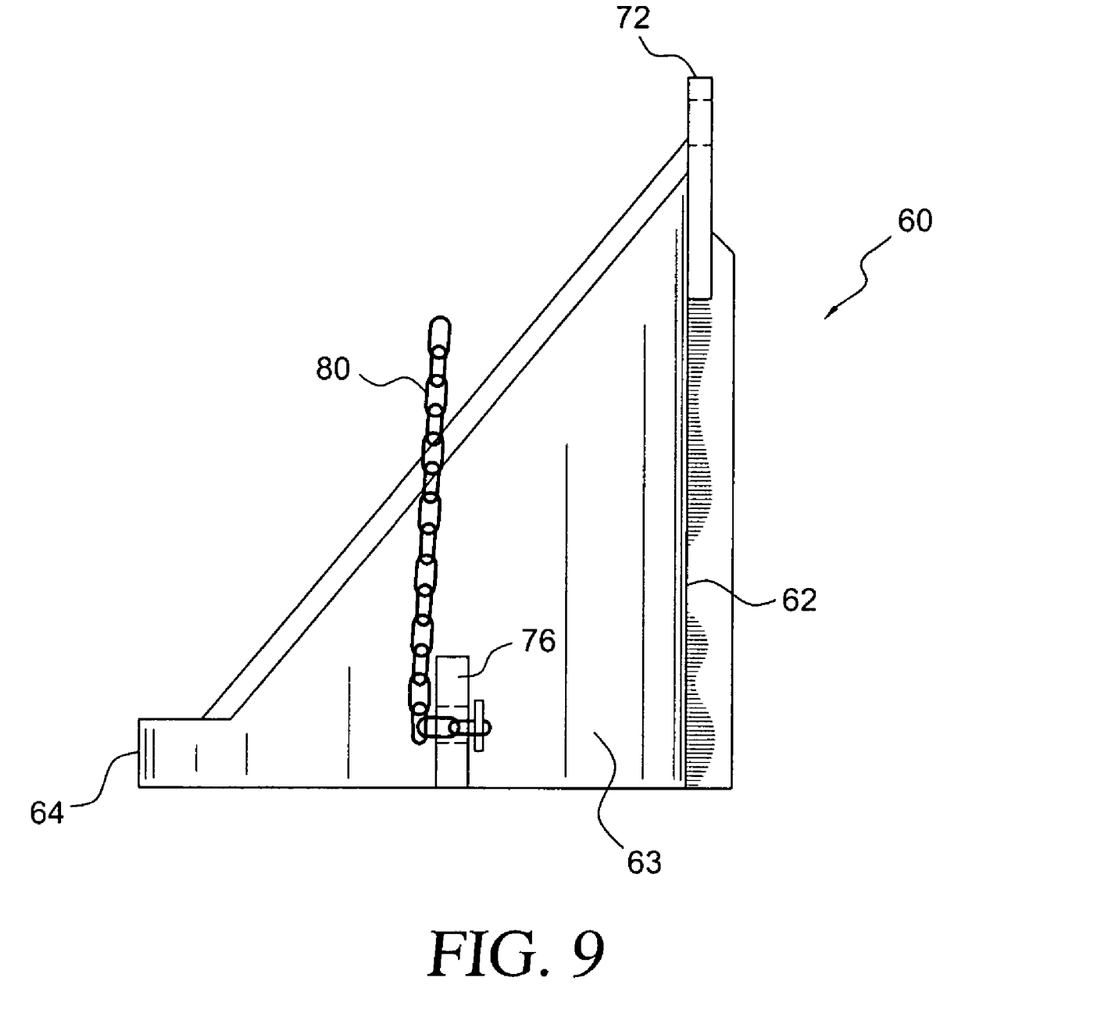
FIG. 9 is a side elevational view of the insulator support assembly of FIG. 6.
Figure 10:
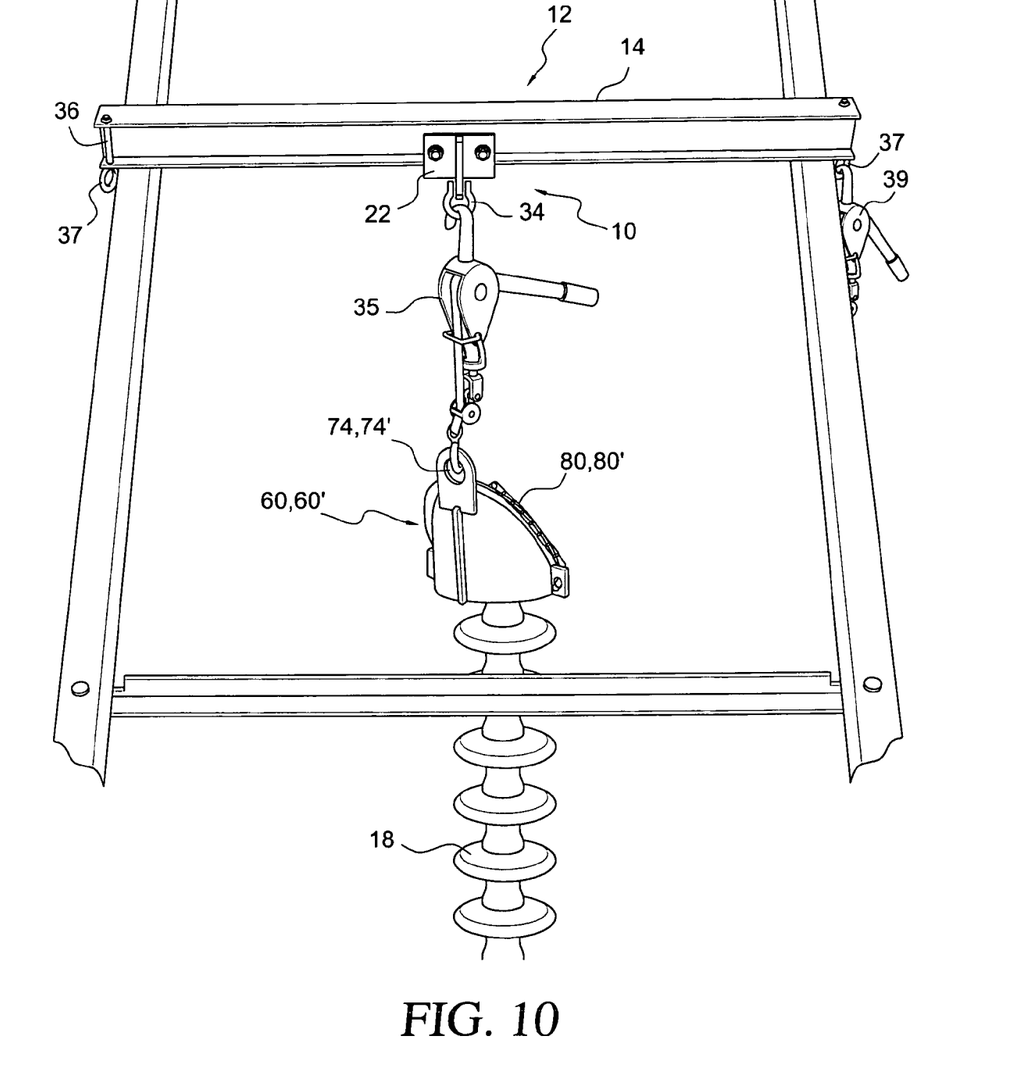
FIG. 10 is a perspective view of the insulator transport and support assembly of the present invention emplaced on a lattice-type tower and supporting an electrical insulator in the cradle of the support assembly.

A trolley 22 is adapted to roll, via attached trolley wheels 24, along the length of the I-beam on the upper surfaces of the lower flanges 17a, 17b on both sides of central web 20. Trolley 22 is generally U-shaped including a pair of spaced upstanding side walls 26 and a horizontal connecting base 28 extending therebetween. A flange 30 depends from connecting base 28 and includes an aperture 32 for receiving a first shackle 34 to which a first chain hoist 35 may be attached, as is more fully explained hereinafter. Trolley wheels 24 rotate on axles 31 which extend through apertures in the side walls 26 and are bolted in place. Thus, it can be seen that trolley 22 can roll along the lower flanges 17a, 17b of I-beam 14 from one side of the I-beam to the other and, thus, from one side of the tower bridge 44 or tower arms 46 to the other. At each end of I-beam 14, eye bolts 36, held in place by nuts 38, pass through vertically aligned apertures in flanges 15 and 17 and act as stops to prevent trolley 22 from rolling off an end of the I-beam 14. Eye bolts 36 also provide a site for attaching a second shackle 37 to which a second chain hoist 39 can be attached. The second chain hoist 39 facilitates the transfer of damaged and replacement insulators between the trolley and a helicopter, as will be discussed in greater detail hereinafter. It will be appreciated that since the purpose of the trolley 22 is to transport heavy insulators, the I-beam is positioned by the linemen on the tower girders as close as possible to the insulator being replaced and is repositioned each time a different insulator is being replaced.

The insulator support and transport assembly 10 also includes an insulator cradle 60 for safely supporting an electrical insulator during movement along the tower 40 and during transport to and from the tower 40 via helicopter. Cradle 60, is a partially peripherally enclosed, open topped structure which comprises a floor 66, an upstanding rear wall 62 and peripheral walls 63 which slope downwardly from rear wall 62 to front wall 64, which has an opening 70 therein. An elongate slot 68 is formed in floor 66 extending rearwardly from opening 70 at least half the distance toward rear wall 62. Slot 68 has a width at least sufficient to receive a shank of an insulator string and floor 66 has a shape and is dimensioned to allow a circular skirt of an insulator string to lie flat thereon within the peripheral walls of cradle 60, all as is more fully described hereinafter. In the preferred embodiment, which is best seen in FIGS. 6-9, cradle 60 is an open top, closed bottom hollow cylinder, the axis of which has been sliced at an angle by an inclined plane to define, in side elevation (see FIG. 9), a rear wall 62 and peripheral walls 63 sloping downwardly toward a shorter front wall 64. Cradle 60 includes a floor 66 having an elongate slot 68 therein extending from the front wall 64 toward the rear wall 62. Desirably, slot 68 extends at least half the distance from the front wall 64 to the rear wall 62. Front wall 64 includes an opening 70 therein which allows frontal entry into slot 68. Desirably, opening 70 is at least the same width as the width W of slot 68. A lifting ear 72 extends upwardly from rear wall 62 and includes an attachment aperture 74 therein which serves as an attachment eye for attaching cradle 60 to a chain hoist or a helicopter long line, as will be discussed more fully hereinafter. In addition, a pair of chain support ears 76, each having an aperture 78 therein, extend radially outwardly from the cylindrical walls of the cradle, for attachment to a lifting chain 80 (shown in FIGS. 6-10 in its extended position, as if supported from above by a lifting device, such as a chain hoist). Chain support ears 76 are desirably positioned approximately midway between the front and rear walls 64, 62 of cradle 60 with the bottom of the chain support ears 76 approximately level with floor 66 of cradle 60. Desirably, lifting chain 80 has a length which is greater than the largest dimension of the floor 66 and, where the floor 66 is circular, which is about twice the diameter of the floor 66 of cradle 60 such that, with the ends of lifting chain 80 attached to apertures 78 of chain support ears 76 and a chain hoist attached to the midpoint of lifting chain 80, the lifting chain 80 forms two sides of a triangular sling for lifting cradle 60.

Figure 11:
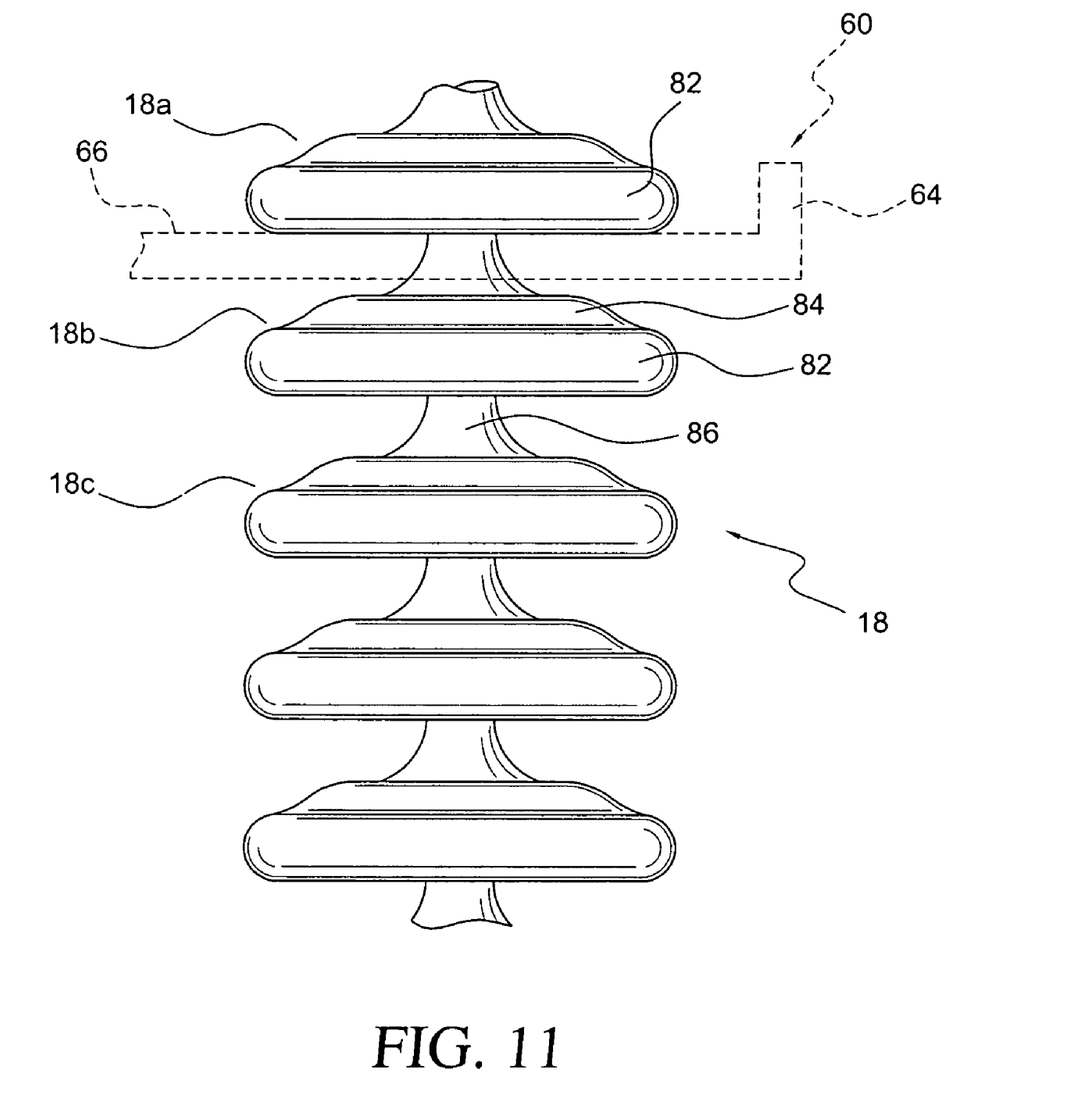
FIG. 11 is a front elevational view of a portion of a typical high voltage electrical insulator string supported within the insulator support assembly of FIG. 6 with the floor and front wall of the insulator support assembly shown in phantom.

With reference to FIG. 11, it can be seen that a high voltage electrical insulator 18 is really a string of individual insulators 18a, 18b, 18c, etc. Each of the individual insulators within the string typically includes a large diameter skirt 82, a central hub on the skirt ("cap") 84 and a smaller diameter cylindrical shank 86 extending upwardly from the hub 84 of one insulator to the underside of the skirt 84 of the next higher insulator in the string. The width W of the slot is large enough to accommodate the diameter of a shank 86 but small enough that it will not accommodate the diameter of the cap 84 or skirt 82. Thus, when an insulator string 18 is inserted through the opening 70 in front wall 64, it is the shank 86 of one of the insulators, e.g., insulator 18b, which slides through opening 70 and slot 68 with the skirt 82 of the next higher insulator 18a in the string above floor 66 of cradle 60 and the hub 84 and skirt 86 of insulator 18b below floor 66. Inasmuch as the front wall 64 of cradle 60 is low along the front side of cradle 60, skirt 82 of insulator 18a in the string is able to pass above the top of front wall 64 as shank 86 of insulator 18b passes through opening 70 and then skirt 82 of insulator 18a rests flat on the floor 66 of cradle 60. In this way, once in place in cradle 60, the insulator string 18 cannot slide out the front of the cradle 60 because front wall 64 blocks skirt 82 of insulator 18a from sliding past. For ease of understanding, floor 66 and front wall 64 are shown in phantom in FIG. 11.

The manner of use of the insulator trolley beam assembly 12 and insulator cradle 60 will be better understood from the following description. Initially, I-beam 14 is placed at a work site which is as close as possible to the insulator string to be replaced and positioned across the span of tower bridge 44 or tower arms 46 with its ends extending beyond the girders of the bridge 44 or arms 46. A first chain hoist 35 is hung from first shackle 34 on trolley 22 and a first insulator cradle 60 is hung via its attachment aperture 74 from first chain hoist 35. The insulator 18 to be replaced is supported within first insulator cradle 60, as hereinbefore described, and the insulator 18 is unpinned from the tower 40 and the conductor yoke 49 until it is supported only by the first insulator cradle 60. Trolley 22 is then rolled from the work site along I-beam 14 toward the end of the I-beam 14 which is most accessible to a helicopter. A second chain hoist 39 is hung from second shackle 37 on eye bolt 36 at the helicopter accessible end of I-beam 14. The second chain hoist 39 is attached to lifting chain 80 of first cradle 60 and first chain hoist 35 is detached from attachment aperture 74 of first cradle 60. A helicopter arrives at the tower 40 carrying a replacement insulator supported by a second cradle 60', which is attached to a helicopter long line via its attachment aperture 74'. The first chain hoist 35 is then attached to lifting chain 80' of second cradle 60' and the helicopter long line is detached from the attachment aperture 74' of second cradle 60'. The now available helicopter long line is attached to attachment aperture 74 of first cradle 60 and the second chain hoist is detached from lifting chain 80 of first cradle 60. The helicopter leaves the tower taking away the old insulator supported in first cradle 60. The replacement insulator supported by second cradle 60', now attached to first chain hoist 35, is then moved from the helicopter accessible end of I-beam 14 to the work site by rolling trolley 22 along I-beam 14 and, while still supported by second cradle 60', is pinned in place. This procedure is repeated for each insulator which is to be replaced.

For purposes of illustration only, an exemplary useful insulator cradle includes a floor having a diameter of about 12", a rear wall extending upwardly from the floor about 12", front walls extending upwardly from the floor about 2" and a front wall opening and slot width W of about 4". Chain support ears extend about 1.5" outwardly from the cylindrical walls of the cradle and are desirably formed of ½" plate stock. The lifting ear is preferably welded to the outside rear wall of the cradle, is desirably formed of ¾" plate stock, usefully has a height of about 10" and a width of about 4.5" and includes a lifting aperture having a diameter of about 2.5".

While the present invention has been described in terms of specific embodiments thereof, it will be understood that no limitations are intended to the details of construction or design other than as defined in the appended claims.

The invention claimed is:

1. In a method of replacing an electrical insulator comprising a string of individual insulators which supports a high voltage electrical conductor on a lattice-type tower comprising the steps of detaching a worn or damaged insulator from the tower and the conductor at a work site on said tower, removing said worn or damaged insulator via helicopter from a helicopter accessible site on said tower, delivering a replacement insulator via helicopter to said helicopter accessible site on said tower, and attaching said replacement insulator to said tower and said conductor at said work site, the improvement comprising:

providing an insulator support and transport means on said tower, said transport means including elongate beam means spanning said tower between said work site and said helicopter accessible site and being detachably affixed to said tower to prevent sliding movement thereof along said tower, said beam means being light enough to be handled by a lineman on said tower, and trolley means movable on said beam means between said work site and said helicopter accessible site, said support means including first cradling means detachably supported by said trolley means for safely cradling said insulator during transport between said sites and during transport to and from the tower via helicopter;

detachably supporting said worn or damaged insulator in said first cradling means while detaching said insulator from said tower and said conductor;

moving said detached insulator in said first cradling means along said beam to said helicopter accessible site;

providing attachment means on said beam at said helicopter accessible site for detachably supporting said first cradling means;

attaching said first cradling means to said attachment means and detaching said first cradling means from said trolley means;

delivering a replacement insulator in second cradling means via helicopter to said helicopter accessible site on said tower;

detachably attaching said second cradling means to said trolley means and detaching said second cradling means from said helicopter;

detachably attaching said first cradling means to said helicopter, detaching said first cradling means from said attachment means and removing said worn or damaged insulator from said tower via helicopter in said first cradling means;

moving said replacement insulator in said second cradling means along said beam to said work site; and supporting said replacement insulator in said second cradling means while attaching said replacement insulator to said tower and said conductor;

whereby said helicopter is able to deliver a replacement insulator and pick up a worn or damaged insulator from the tower in a single trip.

2. A method, as claimed in claim 1, wherein said insulator comprises a string of vertically aligned individual insulators, each individual insulator having at least a larger diameter skirt and a concentric smaller diameter shank extending upwardly therefrom, each of said first and second cradling means comprises a partially peripherally enclosed, open-topped structure having a floor, an upstanding rear wall, peripheral walls sloping downwardly from said rear wall to a front wall, an opening in said front wall, an elongate slot in said floor extending rearwardly from said opening in said front wall at least half the distance toward said rear wall, said slot having a width greater than the diameter of said insulator shank but less than the diameter of said insulator skirt, the shape and dimensions of said floor allowing an insulator skirt to lie flat thereon within the peripheral walls of said cradling means, whereby an insulator shank can be inserted through said opening in said front wall into said slot with the insulator skirt which is vertically above said shank passing above said front wall, and said insulator skirt above said shank lying flat on said floor behind said front wall when said insulator is fully inserted into said cradling means, said front wall preventing said insulator from sliding out of the cradling means.

3. A method, as claimed in claim 2, wherein each of said first and second cradling means further includes a lifting ear extending above said rear wall and including an attachment aperture for attaching said cradling means to said trolley means or to a line extending from said helicopter.

4. A method, as claimed in claim 2, wherein each of said first and second cradling means further includes a pair of chain support ears extending radially outwardly from said peripheral walls of said cradling means on opposite sides thereof, a lifting chain for attaching said cradling means to said trolley means or to said elongate beam means and means attaching opposite ends of said lifting chain to said chain support ears.

5. A method, as claimed in claim 4, wherein each of said first and second cradling means further includes a lifting ear extending above said rear wall and including an attachment aperture for attaching said cradling means to said trolley means or to a line extending from said helicopter.

* * * * *